United States Patent

Phillips

[15] 3,653,479
[45] Apr. 4, 1972

[54] COIN-ACTUATED GOLF BALL TESTING APPARATUS

[72] Inventor: Larry B. Phillips, Bay City, Mich.

[73] Assignee: New Golf, Inc., Essexville, Mich.

[22] Filed: Mar. 23, 1970

[21] Appl. No.: 21,713

[52] U.S. Cl. ............................................................. 194/9
[51] Int. Cl. ....................................................... G07f 17/04
[58] Field of Search ........................ 194/9, 10, 13, 67, 94, 20, 194/33, 46, 11, 12, 14, 15, 16, DIG. 23; 70/283

[56] References Cited

UNITED STATES PATENTS

| | | | |
|---|---|---|---|
| 2,278,416 | 4/1942 | Atti | 73/94 |
| 3,053,370 | 9/1962 | Schuller | 194/94 |
| 2,055,214 | 9/1936 | Christianson | 194/13 X |

*Primary Examiner*—Samuel F. Coleman
*Assistant Examiner*—Thomas E. Kocovsky
*Attorney*—Robert J. Rhead

[57] ABSTRACT

This disclosure relates to a coin-actuated golf ball testing apparatus for testing the compressibility of a golf ball. This testing apparatus has a base, a plate with a bore opening which supports a housing containing therein a resilient actuating pin which permits this actuating pin to move vertically through this bore opening in the base plate. A solenoid is mounted to the top of the base plate and in direct contact with the actuating pin. To this solenoid is mounted a locking pin which extends through a bore hole in a second plate. This locking pin is in direct contact with a cammed drum. Mounted to the cammed drum are extending brackets which support the cammed drum. The cammed drum supports means for testing the physical compressibility of a golf ball.

5 Claims, 2 Drawing Figures

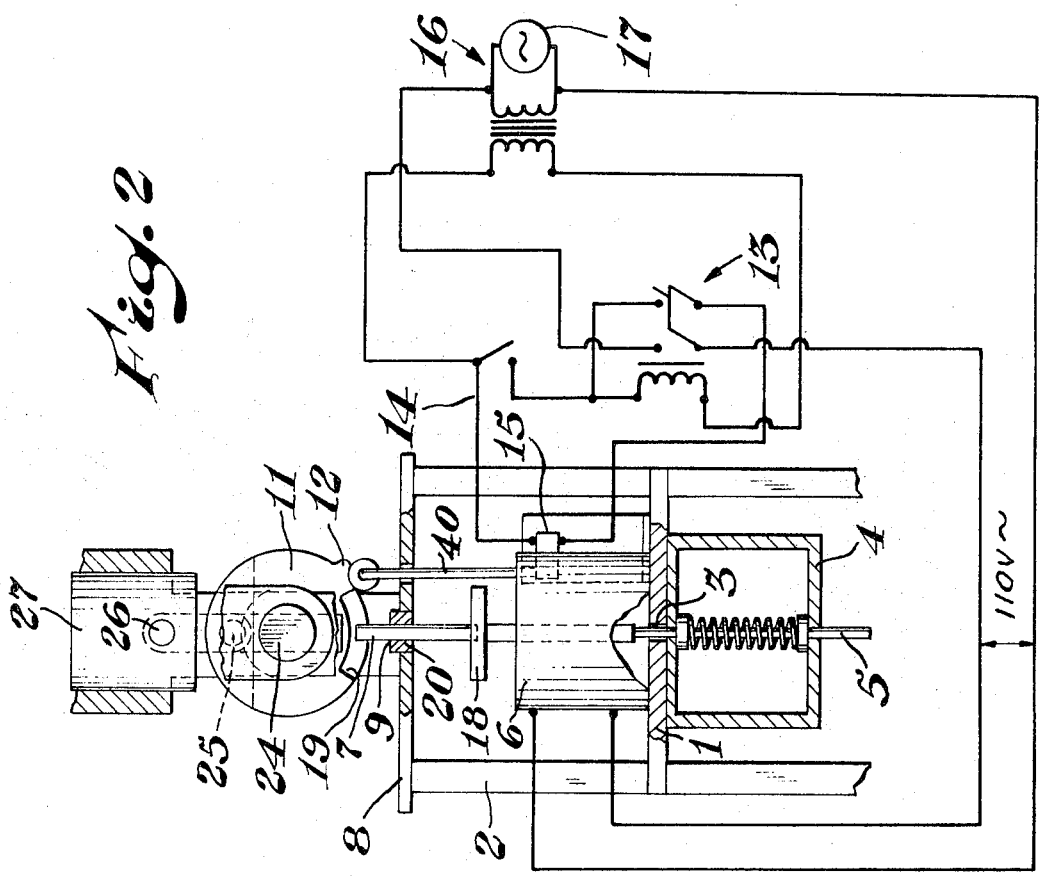
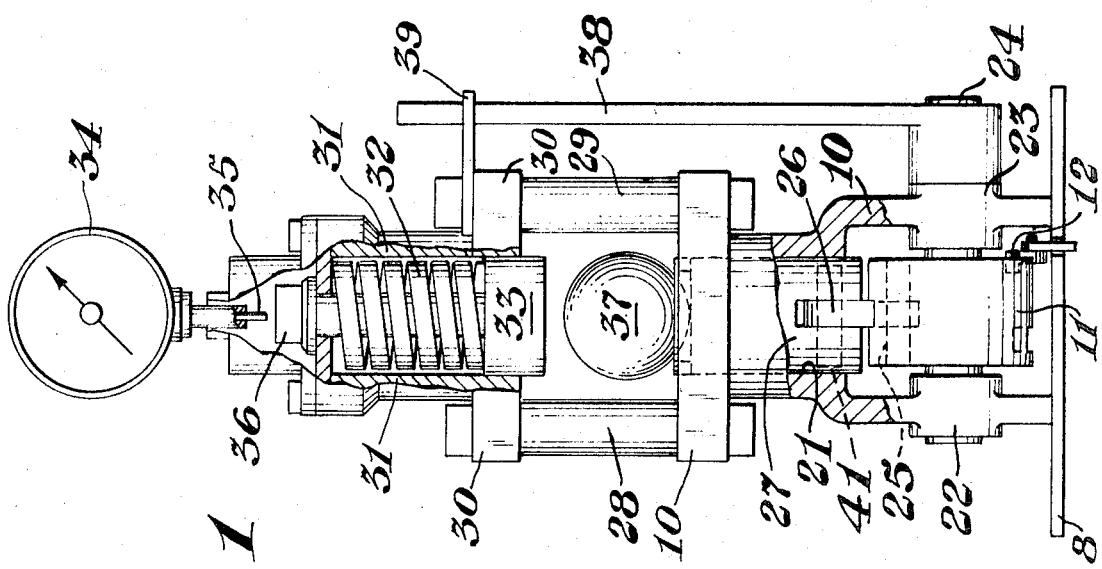
INVENTOR.
Larry B. Phillips
BY
Robert J. Rhead
ATTORNEY

COIN-ACTUATED GOLF BALL TESTING APPARATUS

This invention relates to an apparatus for testing the compressibility of a material. More particularly, the invention relates to a coin-actuated electronic golf ball testing apparatus for testing the compressibility of a golf ball. This testing apparatus is especially suited for testing the compressibility of a golf ball either on the fairway or in the golf clubhouse prior to play or during play.

It has long been recognized that the value of any sporting material, and in particular, a sporting ball, depends upon its physical characteristics, such as strength, durability, compressibility, etc. This is especially so in the manufactured golf ball. It has long been recognized that the value of any sporting ball, and in particular a golf ball, is in its compressibility. The greater the compressibility, the greater the distance achieved upon impact. It has long been recognized in the art to mechanically test the hardness and quality of balls and materials for games and components thereof—U.S. Pat. No. 1,819,232 and U.S. Pat. No. 2,278,416. Pursuant to the modern economic approach to the furnishing of services for a pecuniary interest such as the testing of the compressibility of a game or sporting ball, it has not heretofore been known in the art to combine a game or sporting ball testing apparatus with a coin-actuated vending apparatus. Further, the prior art has failure to realize the need for a locking device used in conjunction with a sporting or golf ball testing apparatus. There is an unfulfilled need to restrict the random use by the sporting public of the testing apparatus without the pecuniary payment for the use of this service.

In view of the foregoing, it is an object of the present invention to provide an improved golf or sporting ball testing apparatus. It is a further object of this invention to produce a coin-actuated golf ball testing apparatus for testing the compressibility of a golf ball. It is still a further object of this invention to produce a coin-actuated golf ball testing apparatus for testing the compressibility of a golf ball but further containing a locking apparatus. Other objects will be apparent to those skilled in the art upon examination of the following specification.

In accordance with certain of its aspects, this invention compresses a coin-actuated golf ball testing apparatus for testing the compressibility of a golf ball, the combination which comprises: a base plate having a plurality of supports and a bore opening therein; a housing containing therein a vertically mounted resilient actuating pin, the housing being affixed thereunder to the base plate in such a way so as to permit the actuating pin to vertically move through bored opening in the base plate; a solenoid mounted to the top of the base plate and in direct juxtaposition to the actuating pin; a vertical locking pin mounted to the solenoid; a second plate mounted to the base plate having a bore hole positioned over the locking pin whereby vertical movement of the locking pin is permitted through bore hole; a modified cammed drum containing a cavity meshing to the locking pin; an upward extending bracket super-posed over the modified cammed drum; means for connecting the bracket portion to the modified cammed drum; means for testing the physical compressibility of a golf ball connected to the bracket portion; a relay electrically connected in series to the solenoid; a coin-actuated microswitch electrically connected in series to the relay and the solenoid; a reset switch electrically connected in series to the coin-actuated microswitch, the relay and the solenoid, and eccentric to the cammed drum; and, an electrical source.

The structural details, principles, advantages and utility of a mechanism constructed in accordance with the invention will become apparent from the following description of the best model now contemplated for carrying out the invention, the description being made with reference to the accompanying drawing wherein:

FIG. 1 is a view in perspective showing a front view of a typical compression testing apparatus;

FIG. 2 is a side view showing in same detail the locking device and the electrical system used in combination with the compression testing apparatus.

In the embodiments illustrated, a base plate 1, having a plurality of supports 2 and a bore opening 3, is positional over a housing 4 containing therein a vertically mounted resilient actuating pin 5. This housing 4 is positioned and affixed thereunder to the base plate 1 so as to permit the actuating pin 5 to vertically move through the bore opening 3. A solenoid 6 is mounted to the top of base plate 1 and in direct juxtaposition to the actuating pin 5. The actuating pin 5 is a vertically mounted resilient pin and is preferably a spring resilient actuating pin. This solenoid 6 has a core 18. This core 18 can be made of any material suitable, but preferably of metal. To the solenoid 6 is mounted a locking pin 7. A second plate 8 is mounted to the base plate 1 and has therein a second bore hole 9 positioned over the locking pin 7 whereby vertical movement of the locking pin 7 is permitted through the second bore hole 9. Surrounding the second bore hole 9 is a bushing 20 which is mounted to the second plate 8, which is intended to act as a guard against the fracturing of the locking pin 7. This bushing 20 is preferably a metal. Mounted to the second plate 8 is an upward extending bracket 10 which superposes a cammed drum 11. In the modified cammed drum 11 is a cavity 19 which meshes with the locking pin 7. The lobe 12 of the cammed drum 11 is meshing with the reset switch 15.

A relay switch 13 is electrically connected in series to the solenoid 6 by any means electrically correct. This relay switch 13 is preferably a single pull, double throw relay, more commonly referred to as a holding relay or holding circuit. A coin-actuated microswitch 14 is electrically connected in series to the relay switch 13 and the solenoid 6. This connection is again accomplished by any electrically correct means. A reset switch 15 is electrically connected in series to the coin-actuated microswitch 14, the relay switch 13, the solenoid 6, and eccentric to the cammed drum 11. The electrical components of this disclosure are activated by a 110–6 volt stepdown transformer 16, which in turn is activated by an electrical source 17.

As shown in FIG. 1, there is provided a base 8 from which an upward extending bracket 10 terminates at the vertically extending cylindrical chambered portion 21. The upward extending bracket 10 is provided with journal bosses 22 and 23 in alignment with one another to receive shaft 24, which is keyed to the cammed drum 11 having a pin 25 eccentrically connecting the link 26 thereto to oscillate in the slot, which link 26 is pivotally connected to the pin 25 extending through the plunger 27 slidably mounted in the chambered portion 21. At the upper end of the chamber portion 21 and desirably extending from opposite sides, there are provided the two extensions 28 and 29. These two extensions 28 and 29 are connected by any means to the chamber portion 21 and upper bracket 30. A spring housing 31 is mounted by any means to upper bracket 30. Enclosed in spring housing 31 is spring 32 which is connected by any means to cylindrical head 33.

Above the spring 32 and connected to the spring housing 31 is positioned a measuring dial 34. This dial 34 is any type dial used to measure compression or hardness of any type material. This dial 34 is provided with a stem 35 that engages a polygraph shaped material 36. This polygraph shaped material 36 is connected to the top portion of spring housing 31. The article to be tested 37, as for instance a golf ball, is placed on the plunger 27.

In the operation of the improved testing machine after the testing article 37 is placed on the plunger 27, the handle 38 which is pinned to shaft 24 is swung upward until it engages the stop arm 39, which is so positioned that in this position of the arm 39 the link 26 will be substantially vertical where the ball 37 will have engaged the head 33.

In view of the foregoing, it will be obvious to one of ordinary skill in the art to place a monetary coin into the coin-actuated microswitch 14 which energizes relay switch 13 and the solenoid 6. This energization produces a holding circuit until the reset switch 15 is depressed or de-activated by reset shaft 40. While this energization produces activation in solenoid 6, which in turn draws the locking pin 7 downward or in an unlocked position. This permits the handle 38 to move in a forward position which motivates plunger 27 to an upward compressing position. Preceding this motivation, object 37 was placed in the void between plunger 27 and the cylindrical head 33. This object 37 is preferably a golf ball or other sporting ball.

The upward motivation of plunger 27 compresses object 37 against the cylindrical head 33. This compression is transmitted to spring 32, whereby this force is measured on dial 34. Upon the forward movement of handle 38, the modified cammed drum 11 and, in particular, the lobe 12 on the modified cammed drum 11, engages the reset shaft 40 which, in turn, de-activates or breaks the circuit in reset switch 15, thus allowing the locking pin 7 to be disengaged from the solenoid 6 and further allowing the locking pin 7 to return to cavity 19 thus locking the apparatus.

The locking pin 7, when there is no holding-activated circuit, is always in a locking position insured by the vertically mounted resilient activating pin 5.

It is obvious that various changes and modifications may be made to the details of construction without departing from the general spirit of the invention, as set forth in the appended claims.

What is claimed is:

1. A coin-actuated golf ball testing apparatus for testing the compressibility of a golf ball, the combination which comprises: a base plate having a plurality of supports and a bore opening therein; a housing containing therein a vertically mounted resilient actuating pin, the housing being affixed thereunder to the base plate in such a way so as to permit the actuating pin to vertically move through bored opening in the base plate; a solenoid mounted to the top of the base plate and in direct juxtaposition to the actuating pin; a vertical locking pin mounted to the solenoid; a second plate mounted to the base plate having a bore hole positioned over the locking pin whereby vertical movement of the locking pin is permitted through bore hole; a modified cammed drum containing a cavity meshing to the locking pin; an upward extending bracket superposed over the modified cammed drum; means for connecting the bracket to the modified cammed drum; means for testing the physical compressibility of a golf ball connected to the bracket; a relay switch electrically connected in series to the solenoid; a coin-actuated microswitch electrically connected in series to the relay switch and the solenoid; and a reset switch electrically connected in series to the coin-actuated microswitch, the relay and the solenoid, and eccentric to the modified cammed drum.

2. A coin-actuated golf ball testing apparatus for testing the compressibility of a golf ball as claimed in claim 1 wherein a bushing is mounted to the second plate eccentric to the bore hole.

3. A coin-actuated golf ball testing apparatus for testing the compressibility of a golf ball as claimed in claim 1 wherein the vertical locking pin is metal.

4. A coin-actuated golf ball testing apparatus for testing the compressibility of a golf ball as claimed in claim 1 wherein the vertically mounted resilient actuating pin is spring resilient.

5. A coin-actuated golf ball testing apparatus for testing the compressibility of a golf ball as claimed in claim 1 wherein the solenoid has a metal core.

* * * * *